United States Patent [19]
Simon

[11] 3,745,366
[45] July 10, 1973

[54] DUAL SOURCE AUXILIARY POWER SUPPLY

[75] Inventor: Martin Simon, Erie, Pa.
[73] Assignee: General Electric Company, Erie, Pa.
[22] Filed: Nov. 4, 1971
[21] Appl. No.: 195,753

[52] U.S. Cl. .................. 307/68, 105/61, 105/62, 290/11, 290/17
[51] Int. Cl. .............................. H02j 9/04
[58] Field of Search .............. 307/47, 66, 67, 68; 290/11, 17; 180/65; 105/35, 61, 62

[56] References Cited
UNITED STATES PATENTS

| | | | |
|---|---|---|---|
| 1,750,297 | 3/1930 | Candee | 290/11 |
| 1,655,740 | 1/1928 | Robson | 105/62 A |
| 2,113,207 | 4/1938 | Yingling | 105/62 R |
| 2,230,580 | 2/1941 | Adams | 105/62 R |
| 3,547,044 | 12/1970 | Lemaire | 290/17 |

Primary Examiner—Bernard A. Gilheany
Assistant Examiner—Thomas Langer
Attorney—Walter C. Bernkopf et al.

[57] ABSTRACT

An auxiliary power supply system for providing controlled alternating current in an electric motor traction vehicle driven by a prime mover through a traction alternator. During normal traction operation the prime mover operates at a high constant rotational speed to directly drive an auxiliary alternator which provides the auxiliary power, while in standby operation the prime mover operates at a reduced constant rotational speed and the auxiliary power is obtained from the traction alternator at the desired frequency and voltage.

3 Claims, 4 Drawing Figures

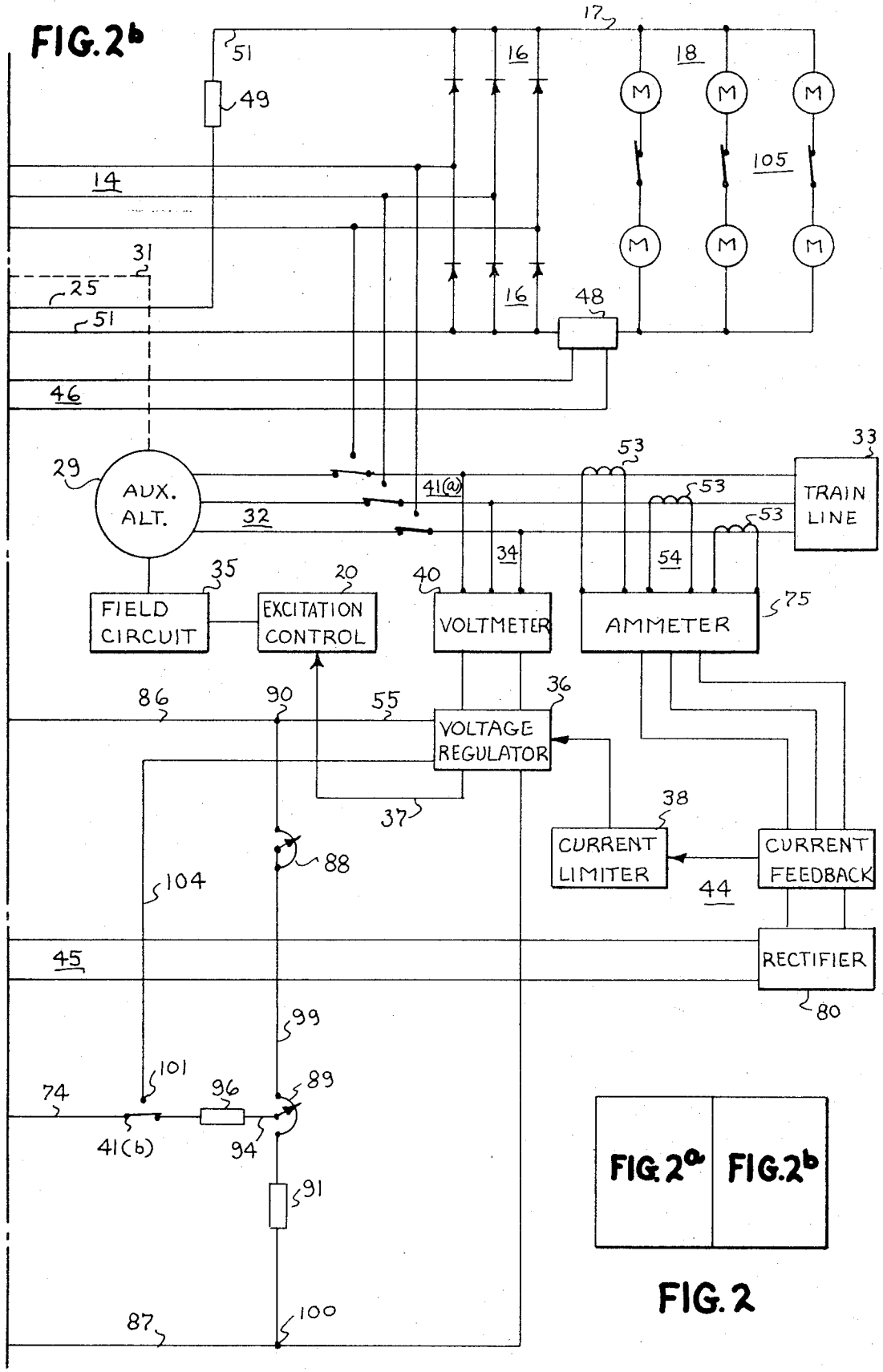

DUAL SOURCE AUXILIARY POWER SUPPLY

BACKGROUND OF THE INVENTION

This invention relates generally to electrical power supply systems for electrically propelled traction vehicles and more particularly to alternating current auxiliary power supply systems utilized in electrically propelled vehicles, wherein alternating current generating means, driven by a thermal prime mover, energizes the propulsion motors of the vehicle.

Traction vehicles, such as diesel electric locomotives, commonly utilize a thermal prime mover to drive a traction alternator whose output provides electrical power to the traction motors. The prime mover, such as a diesel engine or the like is operated at various speeds by throttle control in accordance with the power requirements of the alternator.

In addition to traction power, it has also been necessary to provide auxiliary power for lighting, heating and air conditioning. Frequently, it is desirable to provide alternating current auxiliary power for this purpose. Historically, this power has been provided by an auxiliary alternator which is driven by an auxiliary prime mover at a constant rotational speed to ensure an auxiliary power supply of constant frequency and voltage. The auxiliary prime mover and alternator are thus operated continuously to provide the required power both during periods of normal traction operation and during standby operation, wherein the vehicle is standing idle as when awaiting call. During standby, auxiliary power is required, but to a much lesser extent than when in normal traction operation. This varying of the load on the auxiliary prime mover, which has tradition-ally been a diesel engine, causes considerable problems in mainten-ance with attendant costs. The expense of an extra diesel engine is thus substantial when considering original installation costs and subsequent overhaul demands.

It is therefore desirable to eliminate the auxiliary prime mover and to drive the auxiliary alternator directly from the traction prime mover which has sufficient available power. However, in conventional diesel electric vehicles the speed of the prime mover is varied during operation, by changing the setting of the throttle lever. This variation of prime mover speed would result in a change in auxiliary alternator speed with a corresponding change in output voltage and frequency.

Energization of the auxiliary power source by the prime mover is further complicated because of standby operation of the vehicle. During time periods wherein the vehicle is in a standby condition, the auxiliary power is still required, but the traction power is not, and thus the operation of the prime mover at the constant high speed is impractical. The resulting noise in residential areas is extremely undesirable. A reduction in prime mover speed will reduce the noise level, but would in turn excessively reduce the frequency of the auxiliary alternator. The use of gears to maintain the alternator speed while slowing the prime mover speed would involve unnecessary expense and difficulty.

It is therefore an object of this invention to provide an improved system for generating alternating current of substantially uniform frequency, for use as auxiliary power in a traction vehicle wherein alternating current generating means driven by prime moving means energizes propulsion motors.

It is another object of this invention to attain the aforesaid arrangement without requiring a prime mover additional to the prime moving means otherwise required to drive the propulsion alternating current generating means.

Yet another object of this invention is to provide an improved alternating current auxiliary power source providing substantially constant frequency and output voltage during periods of normal and standby operation of the vehicle.

Still another object of this invention is to achieve the aforesaid objectives without complex gearing and with use of components of the propulsion system of the traction vehicle.

A further object of this invention is to minimize the noise level of a traction vehicle operating in a standby condition.

SUMMARY OF THE INVENTION

The invention relates to an auxiliary power supply system utilizing a prime mover-driven, auxiliary alternator to provide polyphase power of predetermined voltage and frequency during normal traction operation, and utilizing the main-drive traction alternator to provide auxiliary power during standby operation, wherein the prime mover is operated at a considerably reduced speed. The system is amplifier controlled, and provides for voltage and current limits in both modes of operation.

In the drawings as hereinafter described a preferred embodiment is depicted; however, various other modification and alternate constructions can be made thereto without departing from the true spirit and scope of the invention.

DESCRIPTION OF THE PREFERRED EMBODIMENT

Figure 1:
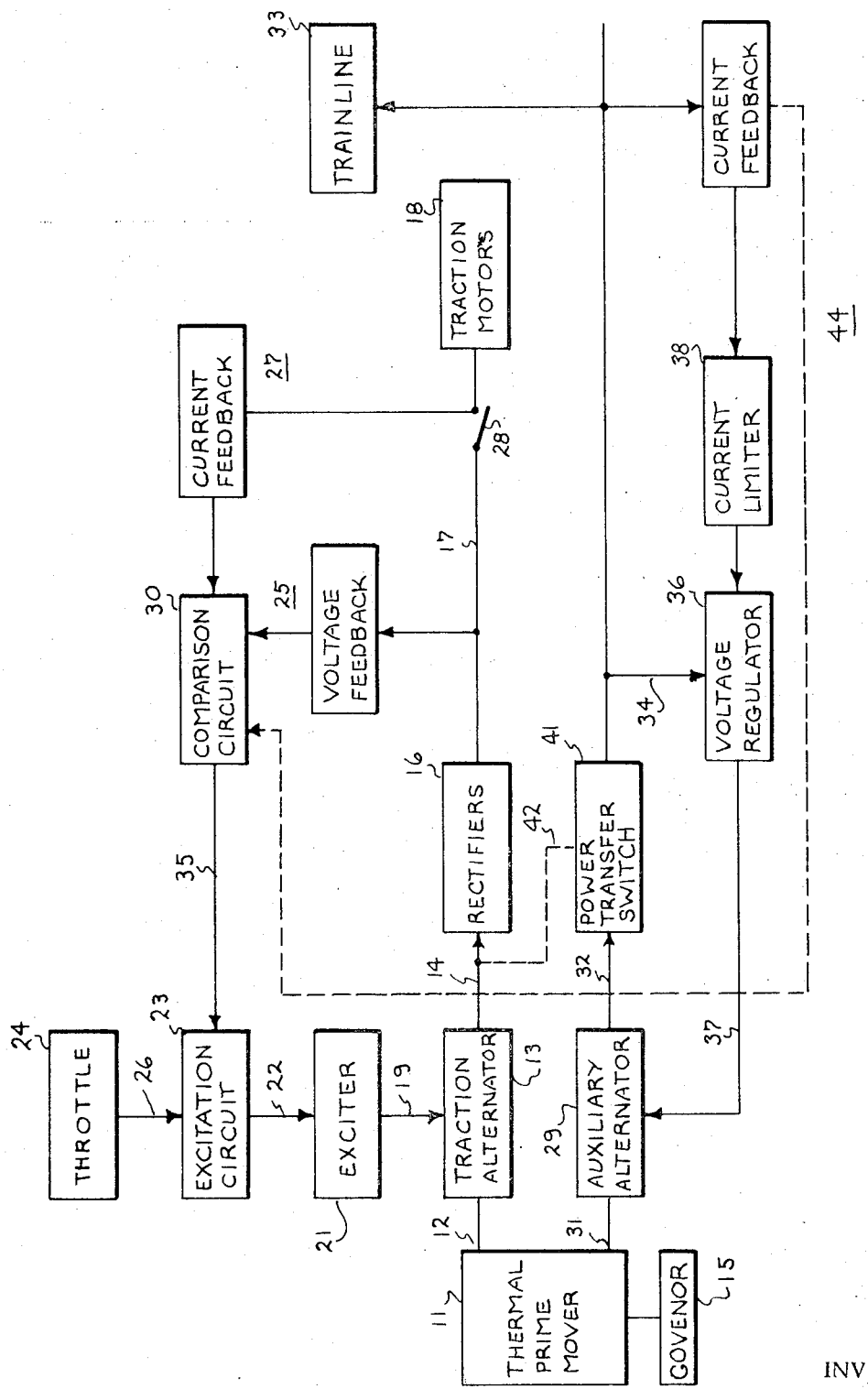
FIG. 1 is a simplified block diagram illustration of a traction vehicle power system showing the incorporated invention in dashed lines.

Reference is now made to FIG. 1. A thermal prime mover 11 such as a diesel engine has its output shaft 12 coupled to drive the traction alternator 13 whose output 14 passes through the rectifier 16 and lines 17 to energize the traction motors 18. Field current for the traction alternator is supplied by lines 19 from an exciter 21 whose input power is supplied by lines 22 from an excitation circuit 23. Adjustment of the throttle position 24 varies the input 26 to the excitation circuit, thus controlling the field current to the traction alternator and hence the load imposed on the prime mover. Accordingly, the output of the traction alternator is varied by changing the field current 19 through the excitation circuit 23. A governor 15 is operably connected to the diesel engine to control its speed at substantially a constant rotational rate.

A prime mover of the diesel engine type characteristically tends to deliver constant power output for a given diesel engine operating speed. Variations in the diesel engine speed result in variations of diesel output power. For reasons hereinafter discussed, it is desirable for certain traction vehicles such as those used on commuter trains, to operate the prime mover at a constant rate of speed regardless of the load.

The power output of the traction alternator is controlled to prevent excessive voltages and currents and additionally to prevent the power requirements of the traction alternator from exceeding the available power output of the diesel engine. Thus, limiting the electrical horsepower requirements of the traction alternator to the available horsepower output of the diesel engine substantially decreases diesel engine wear and avoids diesel engine speed variations and stalling. This limiting action is achieved by a control system wherein voltage and current feedback signals are applied from the line 17 through voltage feedback circuit 25 and current feedback circuit 27 to the comparison circuit 30. The output of the comparison circuit is coupled to the excitation circuit 23 through leads 35 for regulating the excitation and thus the power output of the traction alternator.

The above described arrangement is well-known in the art (for example, in the pending application Ser. No. 859,848 filed Aug. 18, 1969, of Thomas L. Vandervort, and assigned to the assignee of this application).

Traction vehicles such as commuter trains or the like require, in addition to traction power, an auxiliary power system to be provided for the auxiliary machinery used for lighting, heating, and air conditioning of the cars. The power generally required is of the a-c type having a controlled voltage and frequency. During normal operation auxiliary power is provided by an auxiliary alternator 29 driven by the prime mover 11 through a coupling means 31, such as a drive shaft or the like. The constant speed operation of the prime mover during normal operation permits direct mechanical coupling of the auxiliary alternator to the prime mover, thus obviating the separate prime mover in order to maintain a constant power frequency. The output 32 from the auxiliary alternator is applied through power transfer switch 41 to an auxiliary power output circuit, i.e. the trainline 33, for driving the auxiliary machinery. In a preferred embodiment the output is 512 volts at 64 Hz. As previously stated, the prime mover is operated at a constant rotational speed, which include preferred embodiment is 960 rpm, and hence, the auxiliary alternator is also operated at a constant speed, thus ensuring a constant frequency power supply to the trainline. The voltage appearing across the line 32 is applied by the line 34 to a voltage regulator 36. The output of the voltage regulation is directed along line 37 to the auxiliary alternator 29 for which it provides a field current.

A current feedback circuit 44, hereinafter described is provided principally for standby operation wherein the current feedback circuit 27 is open circuited.

A current limiter 38 may be interconnected between the current feedback circuit 44 and the voltage regulator 36 for use during normal operation.

Because of the necessity for maintaining an auxiliary power output for providing heating and cooling during standby operation, it is necessary to maintain operation of a prime mover during this period. However, while continued operation of the diesel engine and regulated output of auxiliary power is required, there is generally a need to reduce the noise level of the prime mover. This noise level is reduced by reducing the speed of the prime mover, and if the speed is reduced and held to a fixed predetermined speed, it will permit use of the main alternator to provide the auxiliary power of constant frequency, thereby eliminating the need for an auxiliary prime mover.

During time periods wherein the traction vehicle is in a standby condition, such as when standing in the yard at night, the power transfer switch 41 is thrown, thereby disconnecting the output of the auxiliary alternator and connecting the output of the traction alternator through line 42 (indicated by a dashed line in FIG. 1). During this period of operation, the prime mover operates at a reduced constant rotational speed, for example 600 rpm, and the auxiliary power to the trainline is obtained from the traction alternator output 14, a typical output being 480 volts at 60 Hz, as shown in FIG. 1. In a standby condition, the traction alternator field is controlled so as to maintain the appropriate auxiliary voltage and to limit output current to a predetermined magnitude. The current feedback circuit 44 sends current feedback signals from the traction alternator output to the comparison circuit, thereby controlling the amount of current being delivered to the line 42 in a manner discussed hereinafter. During standby operation the voltage feedback circuit 25 continues to function, but the current feedback circuit 27, which is responsive to current being delivered to the traction motors 18 is rendered inactive by the switch assembly 28.

The auxiliary power frequency should be maintained within a reasonable range such as ± 12 percent. Frequency output of auxiliary power during standby and normal operation is maintained within that range by appropriate selection of poles of the auxiliary alternator vs. poles of traction alternator. Since the frequency of an alternator. in Hz, is related to the number of poles and the speed, as expressed by the equation $f =$ (number of poles) X (speed), the auxiliary alternator is selected to have a number of poles approximately represented by the equation (number of poles of alternator) = [(R PM standby)/(R PM normal)](Number of poles of traction motor)

An 8 pole, 3 phase auxiliary generator operating at 960 rpm will have a 64 Hz, 512 volt output, whereas a 12 pole, 3 phase, traction alternator operating at 600 rpm will produce a 60 Hz, 480 volt output. Accordingly, the speed of the traction alternator is reduced from 960 rpm to 600 rpm when changing from normal traction operation to standby operation. Thus, an output may be obtained from the traction alternator operating at low speeds which has nearly the same characteristics as the output of the auxiliary alternator operating at higher speeds.

Figure 2A:
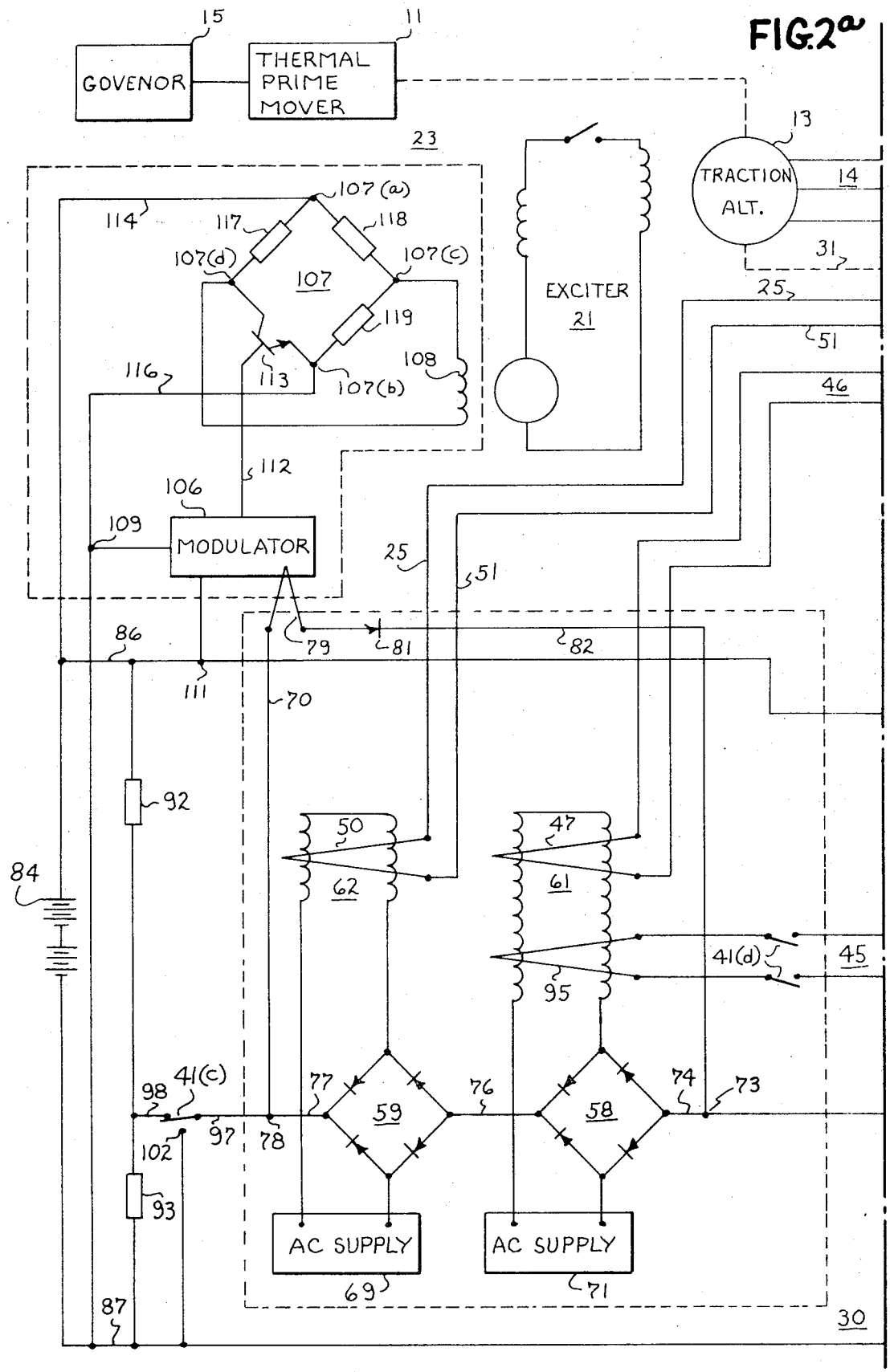
FIG. 2 is a simplified schematic circuit diagram of a preferred embodiment of the system.

Referring now to FIG. 2, the control circuitry of a preferred embodiment is illustrated in partial schematic form and includes in greater detail, the excitation circuit 23, and the comparison circuit 30 (indicated by dashed line boxes) with the corresponding voltage feedback circuit 25 and the current feedback circuits 27 and 44, as well as the relative placement of the contacts of the power transfer switch 41.

The traction alternator 13, which is driven by the prime mover 11, provides three-phase power to leads 14. During normal traction operation of the vehicle the current passes through the rectifiers 16 and hence to the traction motors 18 for driving the vehicle. Provided in the propulsion circuit is a current limit and voltage limit arrangement responsive to the propulsion current feedback circuit 27 and the propulsion voltage feedback circuit 25 respectively. The propulsion current limit is maintained by an ACCR reactor 61 which is responsive to the current flow through a shunt 48 placed in the flow of the drive current. The shunt 48 which is adapted to receive a large current and passes a representative current through lines 46 to the reaction control winding 47 which is responsive to limit the current flow in the circuit as will be hereinafter described. The propulsion voltage limitation is provided by applying a voltage feedback control signal to the traction alternator exciter 21. The output of the rectifiers 16 is coupled by lines 17 and 51 to the control winding 47 of the VCR 62. The resistor 49 in series circuit therewith limits the feedback current. Voltage and current control circuits are well-known in the art as shown by the description in the referenced Vandervort application.

Reference is now made to the control portion of the system which includes the comparison circuit 30 and the excitation circuit 23, each identified in FIG. 2 by a dashed line box.

COMPARISON CIRCUIT

The comparison circuit is of the type described in the previously referenced Vandervort application and includes two bridge rectifier circuits 58 and 59 and associated current and voltage measuring reactors, 61 and 62 respectively. The outputs of the rectifier bridges are serially connected across a unidirectionally conducting output comparison circuit 30. This comprises in series circuit, first output circuit terminal 73, line 74, rectifier bridge 58, line 76, rectifier bridge 59, line 77 and second output terminal 78. The output circuit, connected to terminals 73 and 78 comprises serially connected line 70, the primary winding of a pulse width modulator 79, a rectifier 81 and line 82. The rectifier 81 is poled to permit the conduction of the rectified feedback current through the output circuit.

The reference current entering the first output circuit terminal 73 through line 83 is supplied from two different sources depending on whether the vehicle is operating in a normal traction mode or whether it is operating in a standby condition. In the normal operating condition the reference current is supplied from a circuit comprising a d-c power source 84 connected across line 86 and 87, with a locomotive throttle potentiometer 88 whose arm movement is controlled by the locomotive throttle 24, diesel engine governor load control potentiometer 89, and a dropping resistor 91 connected serially between terminal 90 and 100 and lines 86 and 87 respectively. Also, connected between lines 86 and 87 are the serially connected resistors 92 and 93, the resistor 92 having a substantially greater resistance than that of resistor 93. The actual reference current then flows through a circuit serially comprising the governor control 89, line 94, resistor 96 power transfer switch 41 b, line 83, the comparison circuit 30, line 97, power transfer switch 41c, line 98, resistor 93, line 87, power source 84, line 86, terminal 90, throttle 88 and line 99 to the governor. As the throttle is opened, the resistance is decreased and the reference current to the comparison circuit is increased, thereby providing a greater current and voltage limit. Similarly, the setting of the governor load control, and hence its resistance value, is a function of the capability of the diesel engine. The governor load control circuit has as its function to correct any momentary reductions of engine speed by unloading the prime mover. Accordingly, during normal operation the resistance is at a minimum, while at time of overloading the engine speed is reduced, the resistance of the governor control is increased, and the reference current, and hence the voltage and current limit are reduced.

The current signal in line 70 enters the excitation panel 23 through the PWM winding 79. The excitation panel comprises a pulse width modulator 106, a power transistor bridge circuit 107, and an exciter coil 108. The pulse width modulator which is electrically connected across the d-c power source 84 at terminals 109 and 111, has an outlet line 112 which carries an amplified signal to the base of a power transistor 113 of the bridge circuit 107. The bridge circuit has input terminals 107 a and 107 b and output terminals 107 c and 107 d, the input terminals being connected across the d-c power source by leads 114 and 116, and the output terminals having connected therebetween the exciter coil 108. The NPN power transistor is connected between the terminals 107 b and 107 d with its emitter nearest the terminal 107 b. Connected in the other legs of the bridge circuit are the resistors 117, 118 and 119 connected between terminals 107 d and 107 a, 107 a and 107 c, and 107 c and 107 b, respectively. The PWN is a self-saturating reactor with a main a-c winding and several d-c control windings. The a-c winding is connected from one output of an oscillator to the power transistor, and the d-c windings are connected to line 70. The oscillator provides a square wave a-c to turn the transistor off and on at approximately 800 times a second. The PWM responds to the feedback signals in line 70 and causes the transistor to turn off and on in response thereto, the ratio of off to on time being determined by the power demand and varied accordingly by the signals from the ACCR and VCR. The exciter field is thus fed from the vehicle battery in relation to the transistor on and off control, and the alternator output is varied accordingly.

Figure 3:
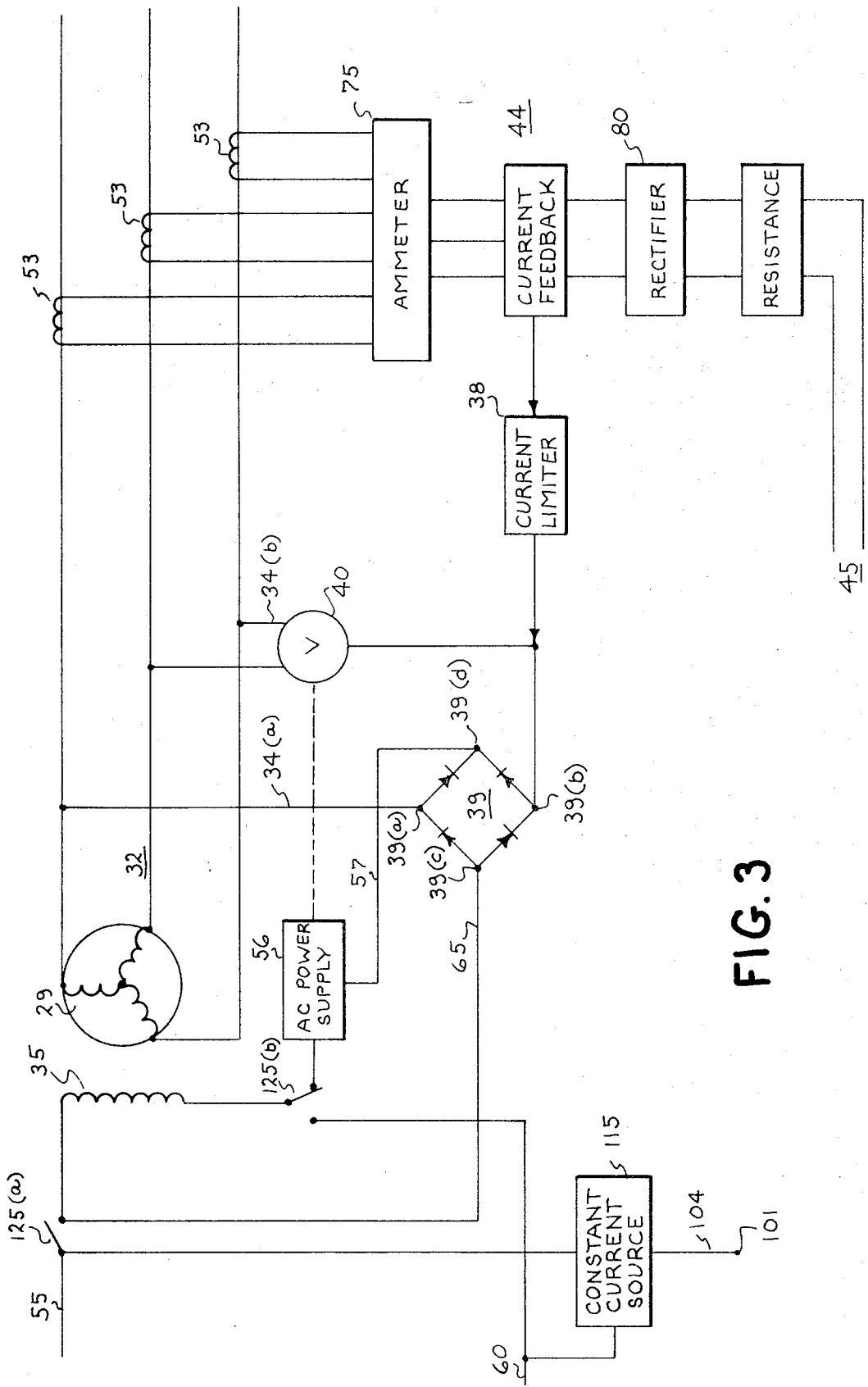
FIG. 3 is a simplified schematic circuit diagram of the voltage regulator and auxiliary alternator excitation portion of the preferred embodiment.

During normal operation of the traction vehicle, the auxiliary alternator 29, driven by the prime mover at a constant speed through coupling 31, provides three-phase current through its output leads 32 to the train-line 33, and through the power transfer switch contacts 41(a) which are set in the indicated position. Voltage limitation is provided wherein voltage feedback signals pass through leads 34 to the input of voltage regulator 36. In the voltage feedback system the leg having the highest voltage is used to generate a limiting signal. The voltage regulator applies one of the three line-to-line voltages to an excitation control circuit 20 which provides a d-c current to the field winding circuit 35. Various known circuits may be used to accomplish this regulation, FIG. 3 shows one arrangement which is commonly used in the art and includes a bridge rectifier 39, voltage measuring means 40, and an a-c power source 56. The bridge rectifier 39, is connected to legs 34 a and 34b at its terminals 39 a and 39b. The alternating inputs from these legs is rectified to enter line 57 through the output terminal 39d. A d-c current is thus provided to the field winding 35 and returns along line 65 to the rectifier input terminal 39c. The a-c power supply 56, such as a chopper or oscillator or the like, is responsive to the voltage measuring means 40 to increase or decrease the flow of current to the exciter field winding 35. The output of the auxiliary alternator 29 is thus voltage regulated. Locomotive battery current from the d-c source 84 is provided by lines 55 and 60 to supply the field current for the initial alternator build-up. The switches 125 a and 125 b are actuated and displaced from the positions shown in FIG. 3 during initial build-up, and are returned to their indicated positions by relays when sufficient current is being provided by the alternator 29 to maintain the field. The current being delivered to the trainline is limited by a conventional current limiter circuit 38 which receives current feedback signals through an ammeter 75 from the current transformers 53 connected to the respective legs of the three-phase output. A rectifier 80 is connected to the output of the current limiter to provide a d-c signal to the current control winding 95 along lines 45.

During periods of standby operation, wherein the traction alternator is providing auxiliary power, the drive switches 105 are opened thereby opening the circuits to the traction motors and to the current feedback shunt 48. Similarly, the power transfer switch is actuated and contacts 41 b and 41 c as well as 41(a) are actuated and displaced from the position shown in FIG. 2 thereby connecting terminals 101, 102 and 103 respectively. The reference current then is a constant current signal coming from the voltage regulator 36 through line 104, which current is directed through the comparison circuit 30 to the terminal 102 through the line 106, to line 87, the power source 84, line 86, terminal 90 and hence back to the voltage regulator 36. The reference current is provided to line 104 from a constant current source 115 which is connected to the vehicle battery 84, across the lines 55 and 60. This constant current source is obtained by conventional circuitry and its output value is appropriately chosen to be equal to the current that flows through the VCR 62 when a specified voltage appears at the output of the traction alternator, (for example, 21 milliamps when the voltage is 480 volts). Similarly, the rectified current feedback in the circuit 44 is adjusted in amplitude by resistors 120 so as to obtain the desired milliamp/volt relationship, wherein when the current being delivered to the trainline reaches a specific predetermined level the ACCR will generate the proper signal to reduce the excitation to the traction alternator, thereby limiting the trainline current to the desired level.

As previously discussed, during normal traction operation, a voltage feedback signal originates at the rectified portion of the traction circuit and is applied by line 25 to the control winding 47 of the voltage measuring reactor 62. During standby operation, this feedback signal continues to be applied from the rectifiers 16. Thus, a voltage limit control is maintained in the same manner as in normal operation.

As stated hereinbefore, current limit control during normal operation is maintained through the control winding 47. However, during periods of standby operation, the opening of the drive switches acts to switch out the shunt 48 and hence the reaction control winding 47. It is necessary, therefore, to provide another current feedback circuit when the power transfer switch contacts 41 d are closed. When a circuit is provided for a current feedback signal to enter from the voltage regulator, along line 45, to the control winding 95 whose signal changes the primary winding impedance and hence modulates the a-c signal from the supply 71.

The current feedback signal output of the current measuring reactor 61 is thus applied to the bridge rectifier 58 and the voltage feedback signal output of the VCR 62 is applied to the bridge rectifier 59. The output of the bridge rectifiers are connected serially by lines 83, 76 and 77 in the reference current circuit. Accordingly, a comparison is effected between the reference current and the voltage or current feedback signal having the larger magnitude. If the voltage and/or current feedback signals exceed the reference current signal in magnitude, a current signal proportional to the difference between the greater one of the feedback signals and the reference current, is applied to the PWM winding through line 70, which PWM winding responds thereto by causing a reduction in excitation to the traction alternator and thus a reduction in voltage. This arrangement limits the maximum voltage and current outputs of the traction generator in reference to current and voltage being delivered to the auxiliary machinery. The excitation circuit is one such as is commonly used in the art and is not considered to be unique. The embodiment which is hereinafter described represents only one manner of controlling the excitation to the traction alternator.

What I claim as new and desire to secure by Letters Patent of the United States are:

1. In a traction vehicle of the type wherein thermal prime mover means drives a traction alternator having a predetermined number of commutating poles and adapted to energize traction motor means, an auxiliary power arrangement adapted to produce alternating current, the combination comprising:
   a. an auxiliary alternator having a plurality of commutating poles greater than the number of poles of said traction alternator;
   b. means for mechanically coupling said prime mover means to said auxiliary alternator;
   c. governor control means for maintaining the shaft speed of said prime mover at a first predetermined shaft speed during normal operation of said traction vehicle and at a second predetermined reduced speed during standby operation of the traction vehicle;
   d. an alternating current circuit having an output adapted to energize auxiliary power circuits and an input;
   e. switching means to connect said input to the output of said auxiliary alternator during normal operation of said traction vehicle, and to connect said input to the output of said traction alternator during standby operation of said traction vehicle;
   f. wherein the number of commutating poles of said auxiliary alternator is substantially equal to the product of the number of commutating poles of said traction alternator and the ratio of said first predetermined shaft speed to said second predetermined shaft speed.

2. The auxiliary power source of claim 1 and including control means having an input connected to be responsive to the traction power applied to said traction motors and an output connected to regulate the excitation of said traction alternator, wherein during standby operation of said vehicle, said control means is connected to be responsive to the output of said alternating current circuit.

3. A traction vehicle propulsion system as defined in claim 2 wherein said control means is effected by a reference current, said reference current during normal operation being variably responsive to said governor control means and during standby operation being a constant current of of a predetermined magnitude.

* * * * *